May 13, 1930.  W. F. HEROLD  1,758,000
CASTER BRACKET SOCKET
Filed April 21, 1927

INVENTOR.
WALTER F. HEROLD.
BY
ATTORNEY.

Patented May 13, 1930

1,758,000

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER-BRACKET SOCKET

Application filed April 21, 1927. Serial No. 185,510.

The present invention relates to caster bracket sockets, especially for use upon angle iron furniture legs, and has for an object to provide a bracket socket of relatively great rigidity and structural strength, and which at the same time will be of very simple and inexpensive construction. The term "caster" is used herein broadly to include furniture slides and the like furniture supporting members.

It is particularly proposed to provide a tubular bracket socket having integral ears or flaps for attachment to the furniture leg, and to so form such ears or flaps in relation to the tubular socket portion as to provide a structural shape adapted to most efficiently resist bending strains. To this end the present embodiment consists in providing such ears or flaps in the form of angular structural reinforcing elements adapted to be riveted or otherwise secured to the angle iron leg, and including a vertical bend contiguous to the securing point and intermediate the securing point and the point of junction with the socket portion, so that there is no weakened or bending area between the securing point and the bend. The structure furthermore provides, in cooperation with the angle iron leg, a box-like structure enclosing and rigidly supporting the tubular socket portion.

A further object is to provide a bracket socket which may be adapted for attachment to angular legs in which the angle is either greater or less than a right angle.

With the above and other objects in view, an embodiment of the invention is shown in the accompanying drawings, and this embodiment will be hereinafter more fully described with reference thereto, and the invention will be finally pointed out in the claim.

In the drawings:—

Similar reference characters indicate corresponding parts throughout the several figures of the drawings.

Figure 1:
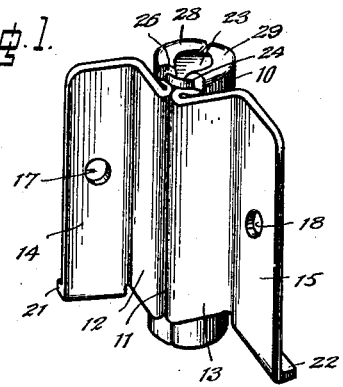
Fig. 1 is a perspective view of the caster socket bracket according to the present embodiment of the invention, and showing the same from the front or outer side.
Figure 2:
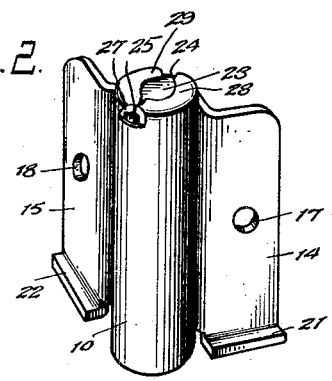
Fig. 2 is a perspective view showing the same from the rear or inner side.
Figure 3:
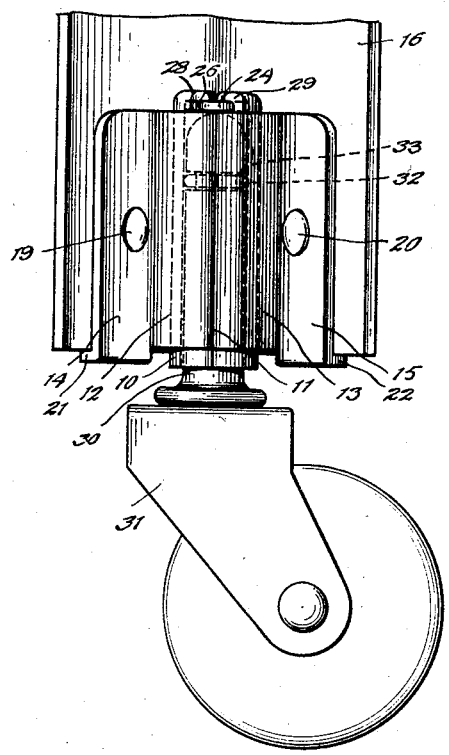
Fig. 3 is a front elevation showing the bracket secured to an angle iron furniture leg, and with the caster in place.
Figure 4:
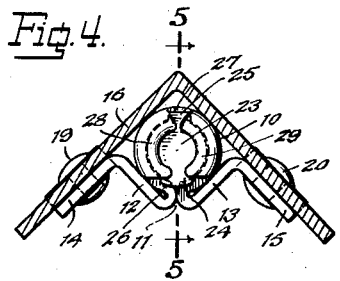
Fig. 4 is a top plan view of the bracket showing the same attached to the angle iron furniture leg, the latter being shown in section.
Figure 5:
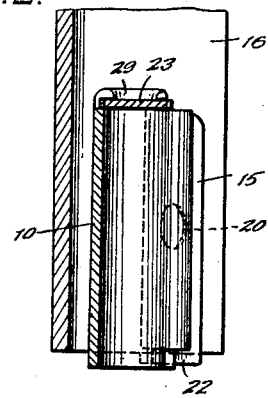
Fig. 5 is a vertical sectional view taken along the line 5—5 of Fig. 4.

Referring to the drawings, the caster socket bracket, according to the present embodiment of the invention, is formed of sheet metal having its mid-section bent to shape to provide a tubular socket portion 10, having a seam 11 at the front, the end portions of the metal being bent away from each other, and rearwardly against the surface of the socket, as at 12 and 13, in substantially right angular relation to each other, and being then bent forwardly as at 14 and 15 in right angular relation to the portions 12 and 13, and with the rearward surfaces of said forwardly bent portions tangential to the outer cylindrical surface of the socket portion, so that in the engaged relation with the angle iron furniture leg 16 the socket portion is snugly engaged in the angle of the leg, while the forwardly bent ear or flap portions 14 and 15 are flatly engaged against the sides of the angle iron leg. The flap portions 14 and 15 have rivet holes 17 and 18 respectively provided therein, substantially contiguous to the vertical bend between said portions and the portions 12 and 13, and with the rivets 19 and 20 in place, the flap portions are free from any unsupported bending area between the points of attachment and the vertical bend. The flap portions are extended downwardly at their lower ends and are bent outwardly, as at 21 and 22, to provide bottom flanges for engaging beneath the lower end of the furniture leg.

At the top of the tubular socket there is provided a top bearing consisting of a bearing plate 23 having forwardly and rearwardly extending projections 24 and 25 seated upon the flat bases of recesses 26 and 27 cut in the metal, and secured by flanging over the upper end portions of the tubular socket, as at 28 and 29. The socket is adapted to receive the pintle 30 of the caster 31, the pintle, as shown in the present embodiment, being removably secured within the socket by means of a split spring ring 32 loosely disposed in an annular groove 33 in the pintle, and adapted to frictionally grip the inner surface of the socket.

The present construction provides a caster socket bracket which is inherently rigid and free from any weakened areas subject to bending under the varying strains that are set up in the bracket during use, and particularly during use with a swivel caster in which the different positions of the wheel impose different bending characteristics upon the bracket. In any position of the wheel, however, the bending strains are directly opposed by the structural angular formation of the attachment flaps or ears of the bracket, and are primarily imposed upon the metal edgewise of the flat areas rather than against the flat surfaces of such areas. By providing the vertical bend in the flap portions contiguous to the points of attachment, there are no unsupported flat areas between the points of attachment and the socket portion, so that with the caster wheel forwardly and exerting an outward pull upon the socket at its lower end, or with it rearwardly and exerting an outward pull upon the socket at its upper end, there is a direct resistance to bending strains within the vertical bends, and the rigid structural formation of the flap portions prevent any possibility of bending within them. In previously known types of sockets in which the flap portions were bent forwardly from the rearward side of the socket and in which the points of attachment were of necessity substantially spaced from the bends, a weakened area existed in the flat metal between the points of attachment and the bends, and under excessive loads the bracket would bend along these areas. The present construction furthermore provides, in cooperation with the angular furniture leg, a box-like support for the tubular socket, whereby it is enclosed and rigidly supported, its support at the rear being directly against the angle iron and at the front directly against the integral flap portions 12 and 13, which in turn are supported by the flap portions 14 and 15, the load imposed upon said portions 14 and 15 being edgewise thereof, and therefore offering the maximum resistance to bending. In the previously known types of sockets wherein the bends between the tubular socket and the flap portions were at the rear and therefore interposed between the socket and the angle iron furniture leg, there was a tendency for distortion along the bends, whereas in the present construction the solid support of the tubular socket directly against the angle iron furniture leg precludes this condition. The present construction also permits of attachment of the bracket to angle iron legs in which the angle is either greater or less than a right angle, as it is possible to bend the flaps either into obtuse or acute angular relation, while still maintaining the same cooperative relation between the socket portion and the angle iron leg. In the old type, above referred to, this was not possible, and while it permitted bending from right angular to obtuse angular relation, this change would result in a different cooperative relation of the socket portion, the flaps in such case being spaced from the socket portion rather than abutting it as in the right angular relation.

I have illustrated and described a preferred and satisfactory embodiment of the invention, but it will be obvious that changes may be made therein, within the spirit and scope thereof, as defined in the appended claim.

Having thus described my invention, what I claim and desire to secure by Letters Patent is:

A caster corner bracket socket for angle iron furniture legs, comprising a piece of sheet metal with its midsection curved to form a tubular socket portion adapted to receive a pintle, and adapted to have its rearward surface engaged with the inner angular surface of the angle iron furniture leg, the seam of said socket portion being centrally of its front portion, and attaching flap portions bent from said tubular socket portion in opposite directions from the seam and rearwardly against the surface of said tubular socket portion substantially at right angles to each other, and being further bent forwardly along an intermediate vertical line substantially at right angles to said rearwardly bent flap portions to provide attaching end portions substantially at right angles to each other and substantially tangential to said tubular socket portion, said rearwardly bent flap portions adapted with the angle iron to form a rectangular enclosing box structure for said socket portion, whereby lateral strains upon said socket portion are resisted in all directions, and whereby pressure of said socket portion away from the angle iron is imposed edgewise upon said attaching end portions.

Signed at Bridgeport, county of Fairfield, and State of Connecticut this 16th day of April, 1927.

WALTER F. HEROLD.